United States Patent [19]
Ema

[11] Patent Number: 5,694,289
[45] Date of Patent: Dec. 2, 1997

[54] INFORMATION PROCESSING APPARATUS WITH OPERATION PANEL WHICH IS CHANGEABLE IN DIRECTION OF OPERATION

[75] Inventor: Hiromichi Ema, Tokyo, Japan

[73] Assignee: Ricoh Company, Ltd., Tokyo, Japan

[21] Appl. No.: 510,495

[22] Filed: Aug. 2, 1995

[30] Foreign Application Priority Data

Aug. 10, 1994 [JP] Japan .................................. 6-187982

[51] Int. Cl.$^6$ .................................. G06F 1/16; H05K 7/02
[52] U.S. Cl. .................................. 361/680; 361/681; 361/683; 248/285.1; 248/922
[58] Field of Search .................................. 312/223.2; 400/489, 400/682, 691–693; 345/168, 905; 248/917–923, 222.41, 285.1; 364/708.1; 341/22; 361/680–683, 686

[56] References Cited

U.S. PATENT DOCUMENTS

| | | | |
|---|---|---|---|
| 3,990,565 | 11/1976 | Felton et al. | 400/682 X |
| 4,661,005 | 4/1987 | Lahr | 400/489 |
| 5,083,290 | 1/1992 | Hosoi | 361/681 |
| 5,267,127 | 11/1993 | Pollitt | 361/680 |
| 5,342,005 | 8/1994 | Szmanda et al. | 248/918 X |
| 5,345,362 | 9/1994 | Winkler | 361/681 |

*Primary Examiner*—Michael W. Phillips

[57] ABSTRACT

An information processing apparatus has a base portion connected to a main apparatus. An operation panel comprises one or more panel units fittable on the base portion in such a way that the panel units can change direction. The operation panel units each include a lower part fittable in the base portion, an upper part including an input device and/or a display device, and a rotating part permitting rotation of the panel units to change direction of the panel units on the base portion. The rotating part is slidable on the base portion between a home position of the panel units and a direction changing position of the panel units. A holder holds and releases each panel unit to fix the panel unit in the home position.

10 Claims, 5 Drawing Sheets

INFORMATION PROCESSING APPARATUS WITH OPERATION PANEL WHICH IS CHANGEABLE IN DIRECTION OF OPERATION

BACKGROUND OF THE INVENTION

1. Field of the Invention

This invention generally relates to an information processing apparatus. The invention is more particularly related to an information processing apparatus with an operation panel which is capable of changing its direction of operating.

2. Discussion of the Background

Generally, information processing apparatuses, for example a facsimile machine, have an operation panel. Operators input operation data into the information processing apparatus by using the operation panel. The operation panels have an input part which consists of a keyboard and function buttons, etc., and a display which displays information about operation, etc. The operation panel is fixed to the main apparatus by, for example, screws, and the direction of the operation panel is pre-decided in accordance with the style of the information processing apparatus.

However, in such an information processing apparatus with an operation panel, in the case of changing the direction of the operation panel, the operator needs to turn the entire apparatus. It may be difficult to find a comfortable position to use the operation panel anywhere in a room.

SUMMARY OF THE INVENTION

It is therefore an object of the present invention to provide an information processing apparatus with an operation panel in which the above-mentioned disadvantages are eliminated.

According to one aspect on the invention, an information processing apparatus has a base portion connected to a main apparatus. An operation panel comprises one or more panel units fittable on the base portion in such a way that the panel units can change direction. The operation panel units each include an upper part comprising an input device and/or a display device, and a rotating part including a lower part and permitting rotation of the panel units in order to change direction of the panel units on the base portion.

According to another aspect of the invention, the rotating part is slidable on the base portion between a home position of the panel units and a direction changing position of the panel units.

According to another aspect of the invention, a holder holds and releases each panel unit to fix the panel unit in the home position.

According to another aspect of the invention, a guide prevents rotation of the rotating part when it is in the base portion between the home position and the direction changing position.

According to another aspect of the invention, a stopper limits rotation of the rotating part to a pre-decided angle.

According to another aspect of the invention, the rotating part has a hole for passing therethrough connecting cables connecting between the operation panel and the main apparatus.

According to another aspect of the invention, the rotating part comprises a shaft connected to the upper part, and the lower part of said panel unit comprises a square lower part of the shaft.

According to another aspect of the invention, a portion of the opening in which the square lower part of the shaft fits when the panel unit is in the direction changing position is circular with a diameter substantially equal to a length of a diagonal of sides of the square lower part of the shaft.

According to another aspect of the invention, the opening in which said square lower portion of said shaft fits, other than said portion of the opening in which the square lower portion of the shaft fits when the panel unit is in said direction changing position, is rectangular with a width substantially equal to a length of a side of the square lower part of the shaft.

According to another aspect of the invention, the shaft includes a plurality of lobes, the holder being a resilient holder engagable with said at least some of the lobes.

According to another aspect of the invention, the stopper comprises projecting parts on the shaft and a stopper part mounted on the base portion at such a location as to stop rotation of the shaft when the sides of the square lower part of the shaft align with sides of the rectangular part of the opening.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

An embodiment of the invention will now be described in detail with reference to the drawings.

Figure 1:
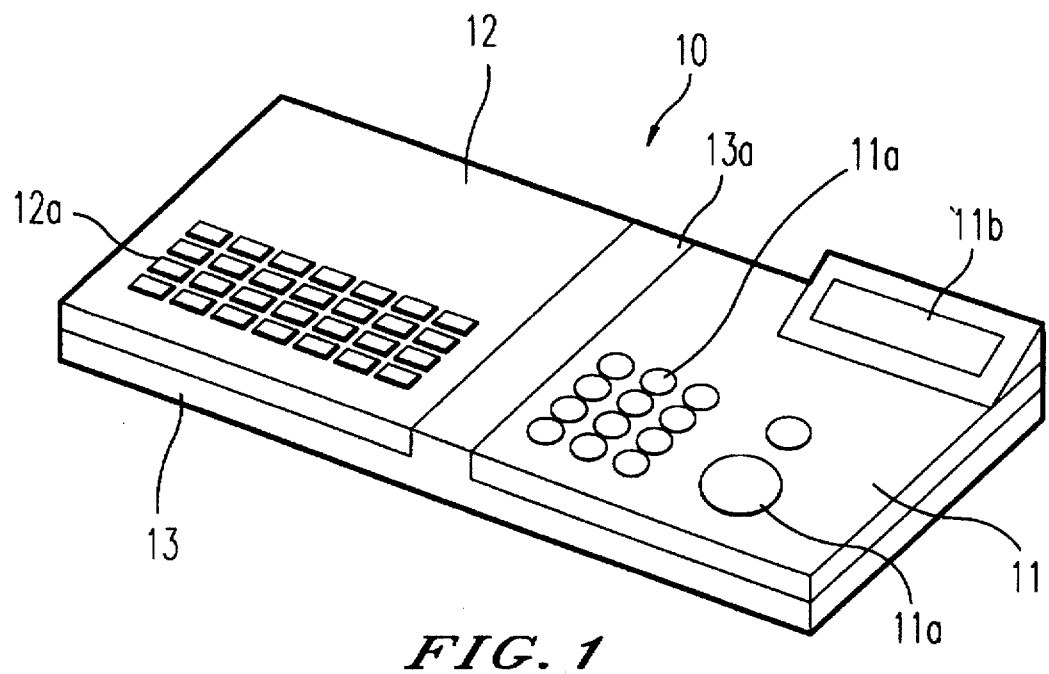
FIG. 1 is an illustration of an information processing apparatus with an operation panel.
Figure 2:
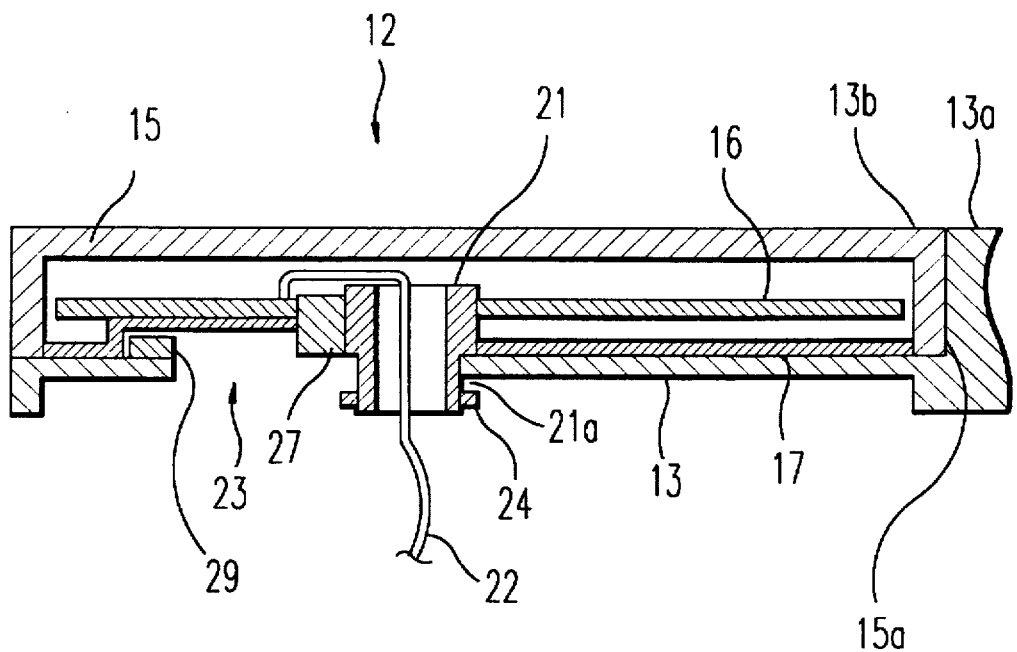
FIG. 2 is a sectional view showing the operation panel.

In FIG. 1 and 2, a main apparatus, for example a facsimile, a copier, a digital copier, or another apparatus or system including a input apparatus, has an operation panel thereon. The operation panel is used for inputting operation data, for example, phone numbers and start/stop operation data. A movable panel unit 10 of the operation panel is put on a base plate 13 of the main apparatus 1. The movable panel unit 10 is comprised of two operation parts (upper parts): an operation unit 11 and an operation unit 12 which are used to input data. The operation units 11 and 12 are positioned symmetrically with a center part 13a between. The operation units 11 and 12 have almost the same shape. The operation unit 11 has a plurality of keys 11a for inputting data, for example dial buttons and a start button, and a display 11b for displaying information for operating the main apparatus. The operation unit 12 has a plurality of keys, for example functional keys or speed dial keys. These keys 11a and 12a, and display 11b, are on the upper side of the frames 15 of operation units 11 and 12. A direction of characters or marks on the keys 11a and 12a, and display 11b, are pre-decided.

As seen in the FIG. 2, the frame 15 of the operation unit contains a printed circuit board 16 which is connected electrically to keys 11a and display 11b. It should be noted that while FIGS. 2 and 3 disclose structure relative to the operation unit 12, essentially identical structure is provided for operation unit 11. The printed circuit board 16 mounted to a bottom plate 17 of the frame 15. The bottom plate 17 is for protecting against microwaves or static electricity which may be produced by rotation of the frame 15 or other factors. The printed circuit board 16 and the bottom plate 17 are fixed to a shaft 21 at a position nearly at the center of the printed circuit board 16 and the bottom plate 17.

The shaft 21 comprises a rotating part for rotating the operation unit 12. The shaft 21 has a hole in the center thereof. A connecting cable 22 which connects the printed circuit board to the main apparatus passes through the hole in the center of the shaft 21 and a hole 23 of the base plate 13. The shaft 21 has a stopper 24 mounted to its lower part 21a to prevent the shaft 21 from being removed from the hole 23.

Figure 3:
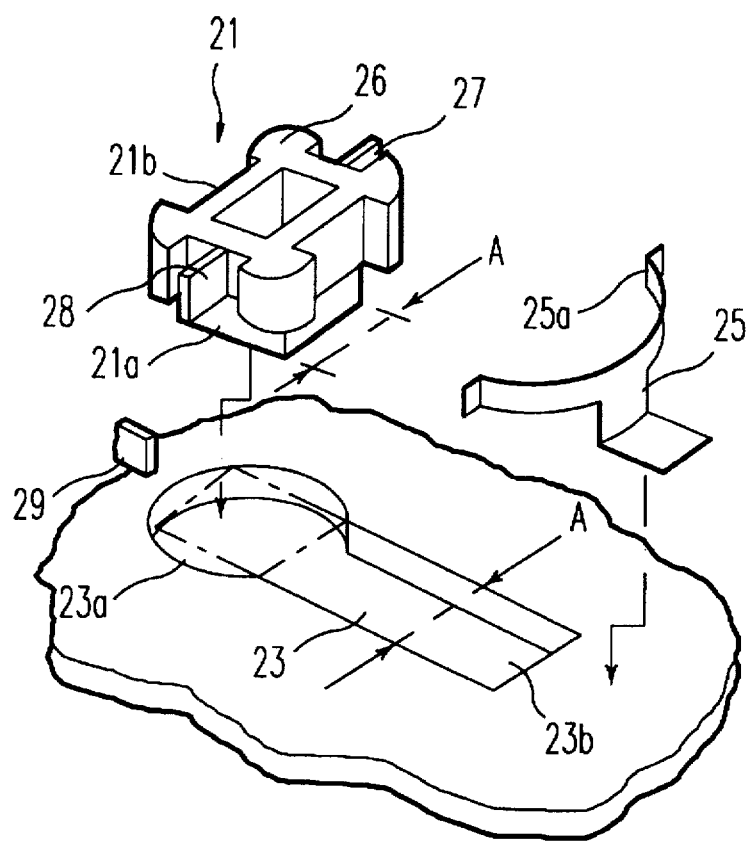
FIG. 3 is an exploded view in perspective of a shaft for rotating the operation panel and a guide hole for the shaft.

As seen in the FIG. 3, the lower part 21a of the shaft 21 is square in shape and fits within the hole 23 of the base plate 13. The hole 23 of the base plate 13 has two parts. One part is a circular part 23a which is circular in shape. The diameter of the circular part 23a is almost the same as, but slightly larger than, the length of a diagonal of the square of the lower part 21a. The other part is a rectangular part 23b which is rectangular in shape. The width A of the rectangular part 23b is almost the same as, but slightly larger than, the length of a side of the square of the lower part 21a. The shaft 21 is thus rotatably fitted to the hole 23 at the circular part 23a, and is non-rotatably fitted to the hole 23 at the rectangular part 23b.

The circular part 23a is located at the end of the hole 23 opposite the center part 13a, and is positioned so that the frame 15 is able to rotate therein without touching the center part 13a. The rectangular part 23b extends to such a position that the frame 15 is able to slide therein until the frame reaches a home position where the side part 15a of the frame 15 touches the side part 13b of the center part 13a, as seen in the FIG. 2.

An upper part 21b of the shaft 21 is also square in shape but the size of the square of the upper part is bigger than that of the lower part 21a. The square of the upper part 21b has four lobes 26 at the corners thereof. Two of the lobes 26 which face the center unit can connect to side parts 25a of a resilient holder in the form of a plate spring 25 fitted in the hole 23 when the frame side part 15a touches the center unit 13a. The side parts 25a of the plate spring 25 lock onto the two lobes which face the center unit for fixing the operation unit 11 or 12 in the home position. The lock imparted by the plate spring 25 may be released by the application of a certain degree of force in the direction of the circular part 23a.

The shaft 21 has two projecting plates 27 and 28 at the upper part 23b. The project plates 27 and 28 are positioned at opposite side of the shaft and can contact the stopper part 29 of the base plate 13 upon the rotation of the shaft 21 to stop the rotation of the shaft 21. The stopper part 29 is positioned to stop the rotation of the shaft 21 when the orientation of square of the lower part 21a is aligned with the sides of the rectangular part 23b to permit the operation unit 12 to slide therein. The stopper 29 limits the angle of the rotation of the shaft 21 to almost 180 degrees.

FIG. 4–10 illustrate an operation of changing direction of the operation units 11 and 12.

The operation units 11 and 12 are initially in their home positions in the part 23b and so are prevented from rotating.

The operation parts 11 and 12 are locked in the home position by the plate spring 25 connecting to the lobes 26 of the shaft 21.

Figure 4:
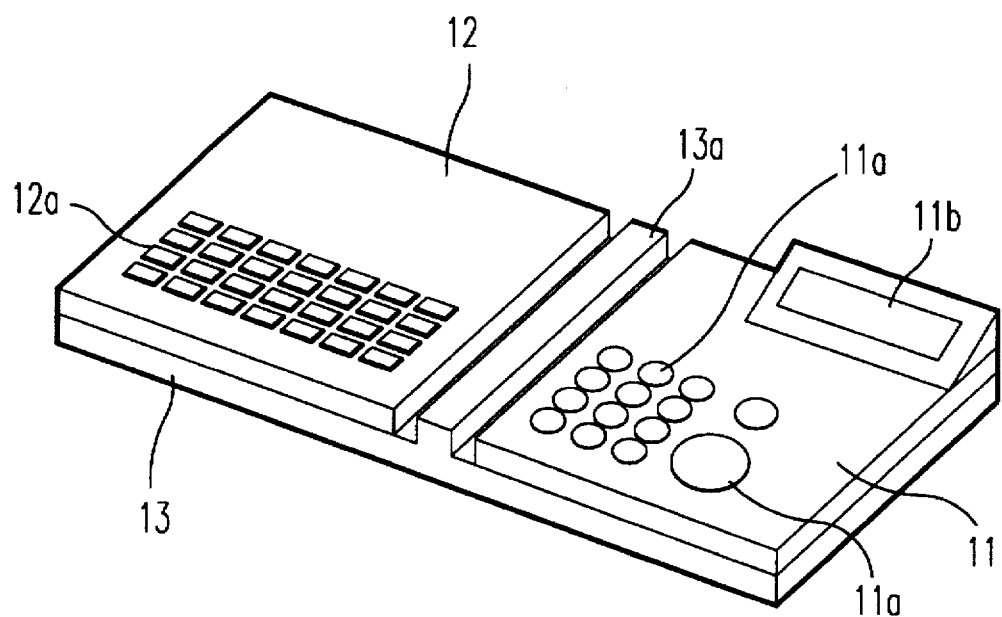
FIGS. 4–10 illustrate the rotation of the operation panel.
Figure 5:
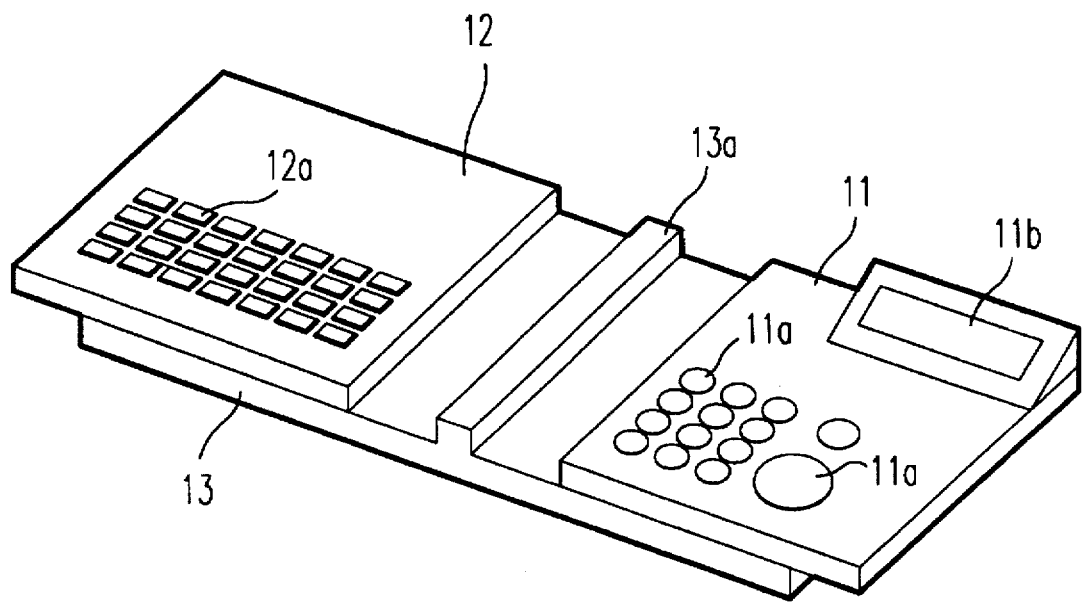

In the position seen in FIG. 4, and 5, the lock of the plate spring 25 is released by applying a force on the respective operating units in a direction away from the center part 13a. The operation units 11 and 12 can then slide in the direction away from the center part 13a while the shaft 21 slides on the rectangular part 23b of the hole 23. During this time, the rectangular part 23b prevents the shaft 21 from rotating.

Figure 6:
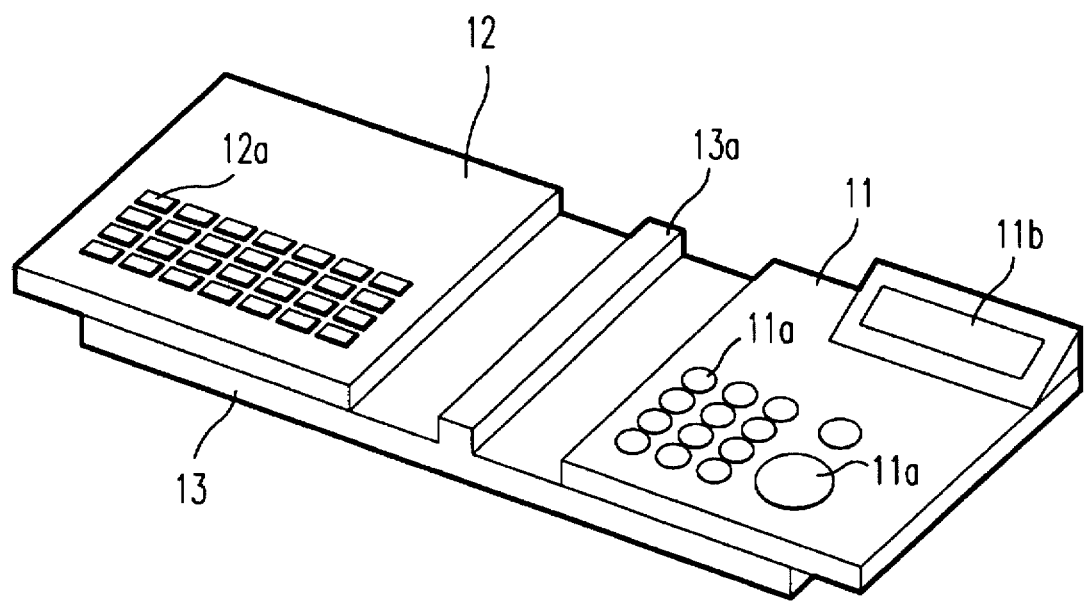
Figure 7:
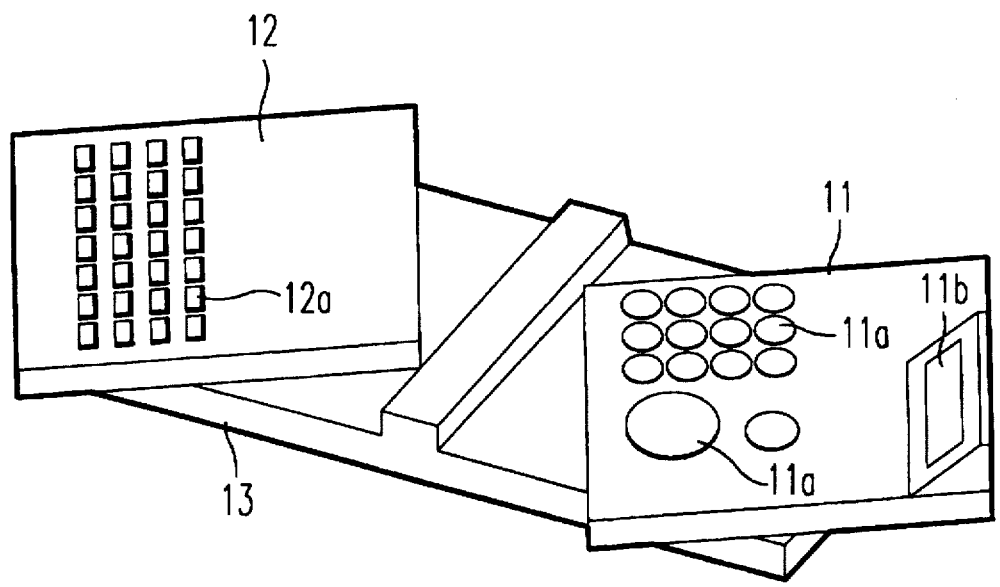

In the position seen in FIG. 6, the shafts 21 of the operation units 11 and 12 have reached the circular parts 23a of the holes 23 and stop sliding. As seen in FIG. 7, the operation units 11 and 12 are rotated clockwise. Rotation of the operation units 11 and 12 is stopped at an angle of 90 degrees by the projecting plate 28 contacting the stopper part 29 of the base plate 13. The sides of the square of the lower part 21a of the shaft 21 is then aligned with the sides of the rectangular part 23b, and the frame 15 is slid back toward the center part 13a.

Figure 8:
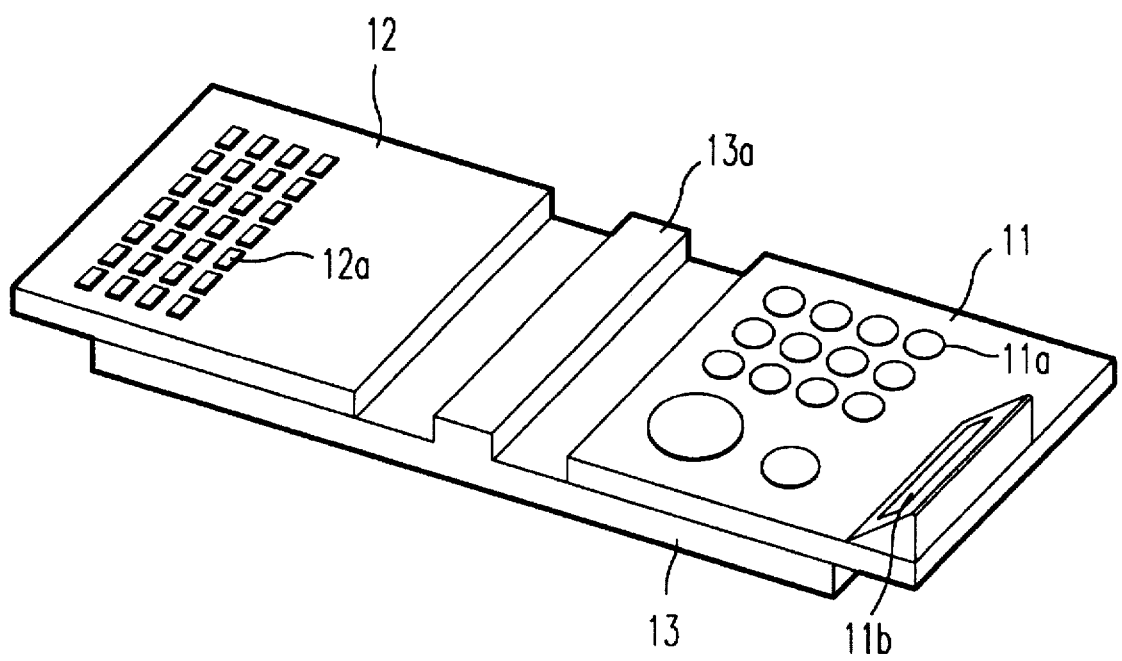
Figure 9:
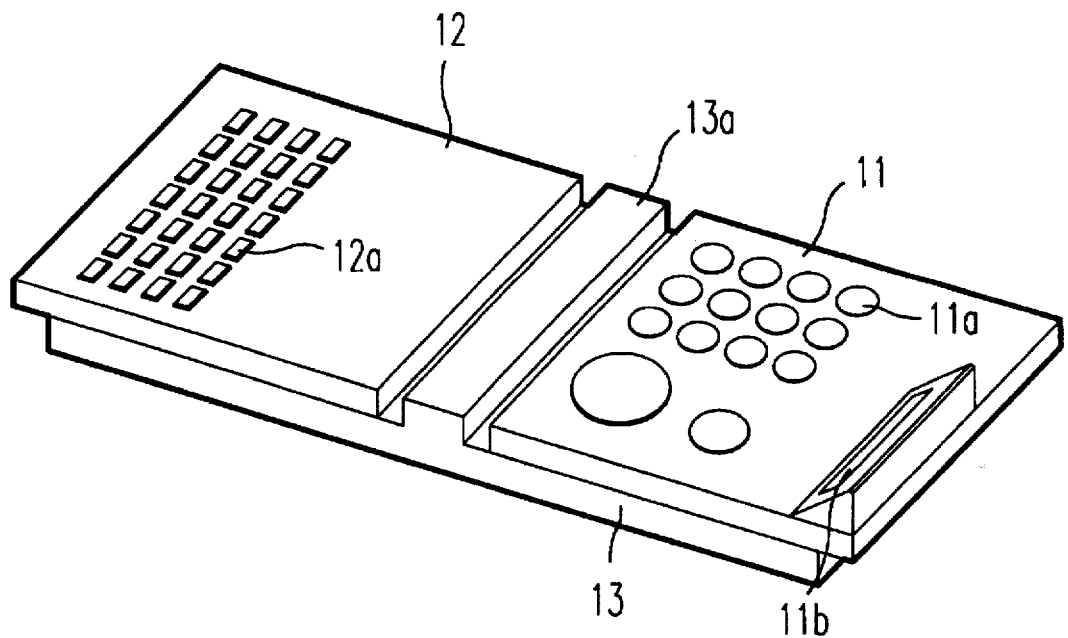
Figure 10:
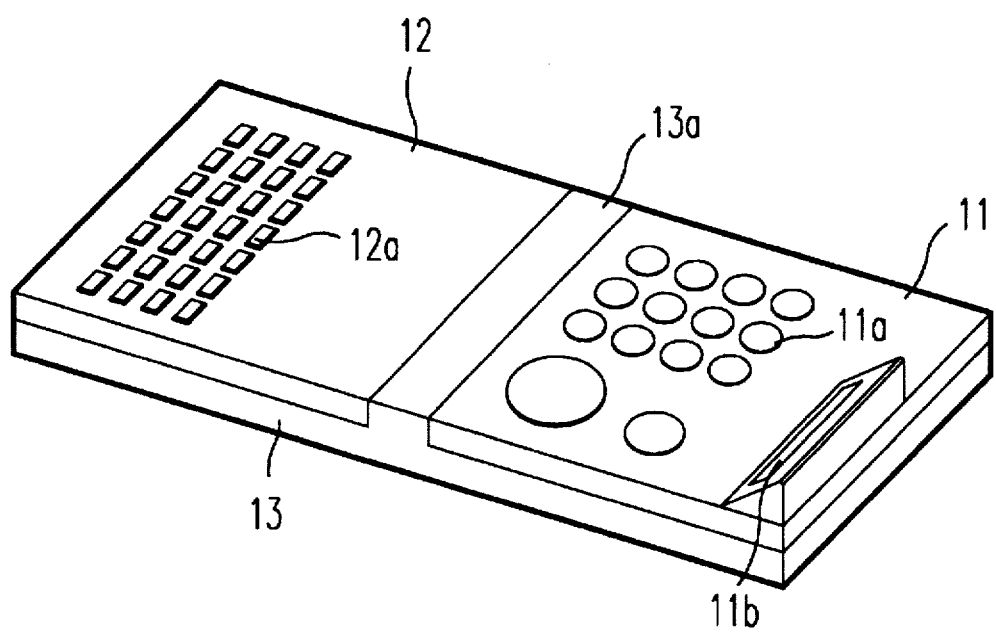

In the position seen in FIGS. 8 and 9, the operation units 11 and 12 are slid toward the center part 13a while being guided by the rectangular part 23b. In the position seen in FIG. 10, the operation unit 11 and 12 are locked by the engagement of the lobes 26 with the plate spring 25.

According to another aspect of the invention, the projecting plates 27 and 28 may be mounted on the base plate 13 instead of the shaft 21.

According to another aspect of the invention, a bearing is used instead of the shaft 21.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An information processing apparatus with an operation panel capable of changing direction, comprising:
   a base portion connecting to a main portion of said information processing apparatus; and
   at least one panel unit comprising an upper part comprising at least one of an input device and a display device, and a rotating part fitted in said base portion, said rotating part being capable of rotatably cooperating with said base portion to permit said panel unit to change direction on said base portion.
   wherein said panel unit is slidably mounted to said base portion for movement between a home position and a direction changing position, and wherein said base portion has an opening in which said rotating part fits, said rotating part and said opening being sized and shaped to cooperate with one another for guiding sliding movement of said panel unit between said home position and said direction changing position while preventing rotation of said panel unit.

2. The information processing apparatus of claim 1, wherein said opening is sized and shaped to cooperate with said rotating part for permitting rotation of said panel unit when said panel unit is in said direction changing position.

3. The information processing apparatus as claim 2, wherein said rotating part comprises a shaft connected to said upper part and having a square lower part.

4. The information processing apparatus as claim 3, wherein a portion of said opening in which said square lower part of said shaft fits when said panel unit is in said direction changing position is circular with a diameter substantially equal to a length of a diagonal of sides of said square lower part of said shaft.

5. The information processing apparatus as claim 4, wherein said opening in which said square lower portion of said shaft fits, other than said portion of said opening in which said square lower portion of said shaft fits when said panel unit is in said direction changing position, is rectangular with a width substantially equal to a length of a side of said square lower portion of said shaft.

6. The information processing apparatus as claim 3 wherein said shaft includes a plurality of lobes, including a resilient holder engagable with said at least some of said lobes for releasably holding said panel unit in said home position.

7. The information processing apparatus of claim 4, including a stopper cooperating with said base portion and said shaft for limiting rotation of said rotating part to a predetermined angle, said stopper comprising projecting parts on said shaft and a stopper part mounted on said base portion at such a location as to stop rotation of said shaft when the sides of said square lower part of said shaft align with sides of the rectangular part of said opening.

8. The information processing apparatus of claim 1, including a stopper cooperating with said base portion and said panel unit for limiting rotation of said rotating part to a predetermined angle.

9. The information processing apparatus of claim 1, wherein said rotating part has a hole for passage of connecting cables connecting said operation panel and said main apparatus.

10. An information processing apparatus with an operation panel capable of changing direction, comprising:

a base portion connecting to a main portion of said information processing apparatus; and at least one panel unit comprising an upper part having at least one of an input device and a display device, and a rotating part mounted to said base portion, said rotating part of each said at least one panel unit cooperating with said base portion to guide movement of said panel unit without permitting rotation between a home position and a direction changing position, and to permit rotation of said panel unit relative to said base portion at said direction changing position.

* * * * *

UNITED STATES PATENT AND TRADEMARK OFFICE
CERTIFICATE OF CORRECTION

PATENT NO. : 5,694,289
DATED : December 2, 1997
INVENTOR(S) : Hiromichi EMA

It is certified that error appears in the above-identified patent and that said Letters Patent is hereby corrected as shown below:

On title page, insert, Item [56], the Attorney, Agent, or Firm should read:

-- Attorney, Agent, or Firm-Oblon, Spivak, McClelland, Maier & Neustadt, P.C. --

Signed and Sealed this

Twenty-fourth Day of February, 1998

Attest:

BRUCE LEHMAN

*Attesting Officer*  *Commissioner of Patents and Trademarks*